Nov. 1, 1932.   H. C. SHOEMAKER   1,885,773
LINE BORING MACHINE
Filed April 22, 1929

Inventor:
Harry C. Shoemaker
By Wilson & McCanna
Attys.

Patented Nov. 1, 1932

1,885,773

UNITED STATES PATENT OFFICE

HARRY C. SHOEMAKER, OF FREEPORT, ILLINOIS

LINE BORING MACHINE

Application filed April 22, 1929. Serial No. 356,948.

The invention relates to improvements in line boring machines adapted for use in boring main bearings as well as cam shaft bearings on engine blocks.

In the operation of line boring machines it has been a very difficult matter to accurately pilot the boring bar so as to obtain the desired high degree of accuracy in the boring of the bearings; there was always bound to be a certain amount of misalignment and distortion, despite every precaution. It is, therefore, the principal object of my invention to provide a line boring machine having pilots specially constructed to float into exact alignment, and, furthermore, specially constructed so as not to impose any distorting stress on the boring bar such as would tend toward misalignment, the same being, however, arranged, when finally set up, to support the boring bar rigidly for the boring operation so that the alignment so carefully obtained will not be destroyed.

The invention is illustrated in the accompanying drawing, wherein—

The same reference numerals are applied to corresponding parts throughout the views.

Figure 1:
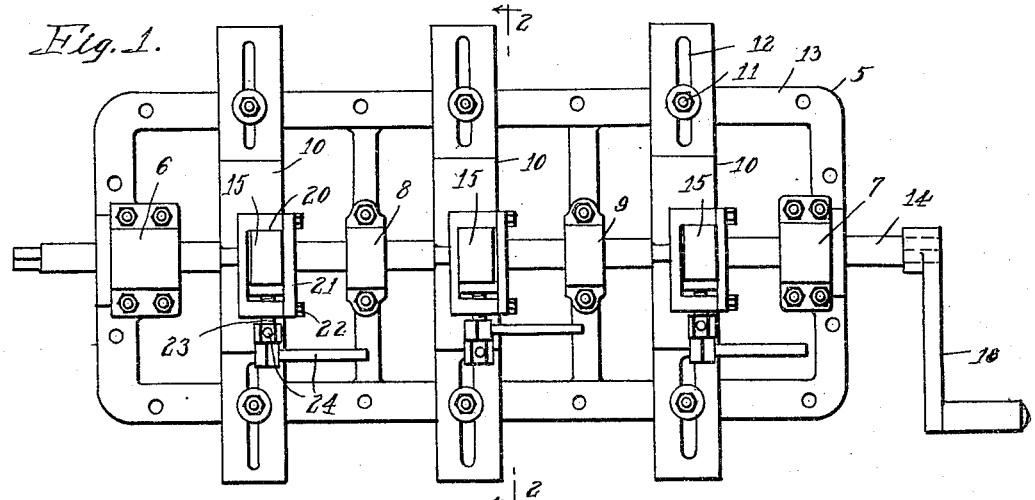
Figure 1 is a bottom side plan view of an engine block with its crank case removed and showing my improved line boring machine set up thereon for the boring of the main bearings.

The engine block designated by the reference numeral 5 has main end bearings at 6 and 7 and intermediate bearings at 8 and 9, this particular block being a six-cylinder block. On blocks of such length the brackets shown at 10 are all mounted directly on the block, receiving bolts 11 in slots 12 to fasten the same onto the side or crankcase flanges 13 of the engine block. On shorter blocks, however, the two end brackets are usually mounted on extension side rails, the boring bar 14 being ordinarily provided of enough length to accommodate as big a block as may ever be encountered, thus permitting of the supporting of the ends thereof beyond the ends of the block especially in the case of smaller four-cylinder blocks. At least three supporting brackets 10 should be provided, so that pilots 15 will take care of the supporting of the boring bar 14 at the middle and at or near the opposite ends thereof. The pilots 15 have pilot bearings 16 on the lower ends thereof receiving the boring bar, these bearings being suitably split and having bolts 17 for contracting the same to a sufficiently close fit on the bar so that the bar when turned by the hand crank 18, arranged to be applied to either end of the bar, will operate with the desired accuracy, assuming the rest of the machine to be properly set up. A lock nut 19 is provided for each of the bolts 17 to keep the pilot bearings in adjusted position. The pilots 15, it will be observed, extend freely through slots 20 provided in the brackets 10, plates 21 bolted onto the brackets as at 22 serving to limit the movement of the pilots fore and aft in the slots. Clamping screws 23, fitted with hand levers 24 for turning the same, are arranged to clamp the pilots against one side of the slots 20 and thus hold the same against lateral movement therein.

Figures 3, 4, 5:
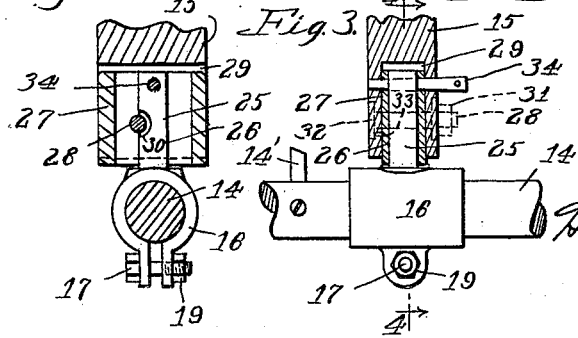
Fig. 3 is a sectional detail on the line 3—3 of Fig. 2.
Fig. 4 is a transverse section on the line 4—4 of Fig. 3.
Fig. 5 is a horizontal section on the line 5—5 of Fig. 2.

Assuming for the present that the pilot bearings 16 form a rigid part of the pilots 15, or are even integral therewith, line boring machines of such type having been built and operated with a fair degree of accuracy, it will be seen that in operation the boring bar 14 may first be centered with reference to the bearings in any suitable or preferred manner, as, for example, by placing two half-bushings in each of the end bearings 6 and 7 and laying the boring bar therein with the pilots 15 slipped onto the same at about the positions represented in Fig. 1, all of the intermediate main bearings to be bored being also inserted previous to this centering of the boring bar. Following the centering operation the cross-brackets 10 are set in place and arranged over their respective bolt holes on the side flanges 13, the pilots 15 being entered through the slots 20. Then all of the clamping levers 24 are tightened and the brackets 10 are bolted firmly in place. Now, it will be evident that in this bolting operation certain of the pilots 15 may have become cramped one way or another and may thus have imposed a distorting stress on the boring bar which would not be consistent with accurate operation. For this reason all of the clamping levers are released after the brackets have been bolted in place, so that all of the boring bar pilots can float into an uncramped position, it being evident that the slots 20 are sufficiently large to permit the pilots 15 to float in a fore and aft direction. At this point it may be well to note that thus far no provision has been described to take care of floating of the pilot bearings in a lateral direction; where the pilot bearings form a rigid part of the pilots any lateral adjustability to prevent distortion of the boring bar has to be accommodated simply by the slots 12. The half-bushings previously referred to may now be removed from the end bearings by simply turning them around the boring bar and withdrawing the same. then the boring bar may be withdrawn just far enough to permit one end bearing to be put in place. The other end bearing can be put into place by withdrawal of the boring bar in the opposite direction, care being taken in each case not to withdraw the bar too far such that its weight has to be carried on one pilot bearing as that would be apt to destroy the alignment; the bar is always kept in at least two pilot bearings if at all possible. The set-up of the machine is then complete for the performance of the boring operation. Bits such as that shown at 14' in Fig. 3 are provided on the boring bar 14 and are arranged to be set with micrometers to bore to the exact size desired. A feed screw sleeve is ordinarily provided in connection with the boring bar to feed the bar endwise at a predetermined rate during the turning thereof by hand. Such sleeve is suitably supported on an outreaching arm carried by one of the end brackets 10, but inasmuch as such expedient is well known and the same forms no part of the present invention, and, furthermore, inasmuch as the bar might be fed by hand or by other means, it has not been deemed necessary to illustrate the same in the drawing. I found it a very good practice to crank the boring bar from the end away from the bearing being bored. Thus, when the front end bearing is being bored, the bar is cranked from the rear end, and vice versa. This eliminates any likelihood of inaccuracy because of a side thrust imposed on the bar by the operation of the crank.

Figure 2:
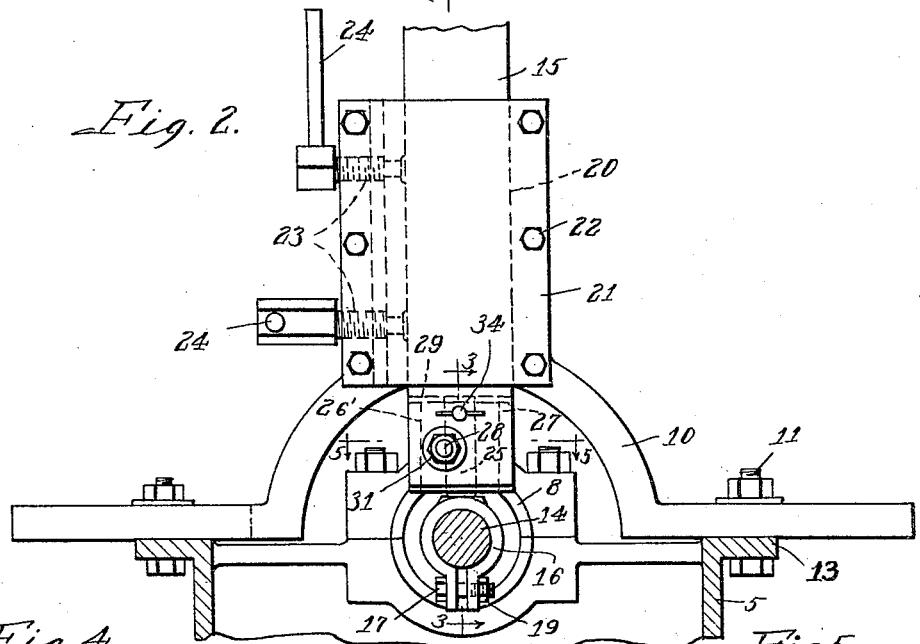
Fig. 2 is a view on a somewhat enlarged scale taken on the line 2—2 of Fig. 1, showing one of the brackets carrying a self-centering pilot provided in accordance with my invention.

According to my invention, the pilot bearings 16 have a universal mounting on the pilots 15 such that any twisting or lateral distortion of the boring bar caused in the bolting of the brackets 10 into place can be corrected, and also the slight, but nevertheless sufficiently appreciable, sag in the boring bar caused by the weight of the pilots being imposed thereon. The construction which will now be described renders each of the pilot bearings 16 self-centering such that the boring bar can be set up without the slightest distortion or misalignment. Referring principally to Figs. 2 to 4, it will be seen that each pilot bearing 16 has a stem 25 received in a hole 26 provided in a block 27 mounted for rocking movement laterally on a bolt 28 in the slot 29 provided in the lower end of the pilot 15. The bolt 28, it will be observed, extends freely through a half-round notch 30 provided in one side of the stem 25. The bolt 28 thus allows a certain amount of endwise movement of the stem 25 in the hole 26 as well as a certain amount of rotary movement on a substantially vertical axis. Furthermore, the mounting of the bearing in the block 27, which in turn is capable of rocking motion in a lateral plane, allows for this third kind of movement of the bearing. And, of course, it was seen above that the pilot 15 is itself capable of floating with reference to the bracket 10 in a fore and aft plane. It is, therefore, evident that every desired kind of movement is provided for, so far as each of the pilot bearings 16 is concerned. Now, before proceeding with a description of the operation, attention is called to the fact that the bolt 28 not only provides a swivel mounting for the block 27 but is also arranged, when the nut 31 thereof is tightened, to clamp the stem 25 and block 27 firmly in any self-assumed position with respect to the pilot 15. For this purpose, saw-slots 26' are made in the block 27 from either side of the hole 26 (see Fig. 5). When the nut 31 is tightened the block 27 is compressed in the vicinity of the hole 26 sufficiently to grip the stem 25 firmly, and at the same time the forked lower end of the pilot 15 is caused to close firmly onto the block 27 so that all of the parts referred to are bound to maintain a stated relationship. The head 32 of the bolt 28, it will be observed, fits into a recess in the side of the pilot 15 (see Fig. 3) and has a pin 33 projecting therefrom into a hole provided in the recess to receive the same, so that there is no danger of the bolt 28 turning when it is desired to tighten the nut 31.

In operation, the same procedure is followed as above set forth excepting that a tapered pin 34 is first inserted into registering holes provided in the pilot 15, block 27, and stem 25, the nut 31 also being tightened, so that the pilot bearing 16 is to all intents and purposes a rigid part of the pilot. Then the tapered pin 34 is removed and from this point on the same procedure is followed as first above described, where the pilot bearing was assumed to be a rigid part of the pilot, but, before the centering bushings are removed from beneath the ends of the boring bar, the lock nut 31 is loosened. This permits the pilot bearing to float into a normal, uncramped position. That is to say, the bearing 16 may float up or down, or to either side, or may even turn slightly on a vertical axis, to the end that the boring bar is absolutely relieved of any distortion or other tendency toward misalignment. It is observed that this construction does not even impose any stress upon the boring bar by reason of the pilot resting thereon and tending to cause the bar to sag under the weight. When the lock nut 31 at each of the pilot bearings is retightened, there is every assurance that the boring bar will turn true and perform the boring operation with the highest obtainable degree of accuracy.

It is believed the foregoing description conveys a clear understanding of my invention and of its various objects and advantages. It should be understood that while reference has been made in the foregoing description to various specific details of construction, the invention is not limited to these particular details. The appended claims have accordingly been drawn with a view to covering all legitimate modifications and adaptations.

I claim:

1. Main bearing boring apparatus comprising a plurality of brackets to be secured to an inverted crank case and extending laterally thereof between adjacent main bearings, said brackets being adjustable laterally of said crank case, one of said brackets extending above said crank case and being provided with a vertically extending slot, a pilot bearing supporting member having a vertically extending portion positioned within said slot for vertical adjustment therein, said slot being of greater width longitudinally of said crank case than the corresponding width of said portion to provide for tilting movement of said supporting member, and means to lock said member in adjusted position, said supporting member having a rectangular slot at its lower end extending laterally of said crank case, a rectangular block positioned within said slot for tilting movement laterally of said crank case and being provided with a vertically extending circular bore, a pilot bearing provided with a vertically extending shank, said shank being positioned within said bore for vertical movement and rotation about a vertical axis, and means to lock said rectangular member and said pilot bearing shank in adjusted position.

2. Main bearing boring apparatus comprising a plurality of brackets to be mounted on an inverted crank case and extending laterally thereof between adjacent main bearings, said brackets being adjustable laterally of said crank case, one of said brackets extending above said crank case and being provided with a vertically extending rectangular slot, a pilot bearing supporting member having a vertically extending rectangular portion positioned within said slot for vertical adjustment therein, said slot being of greater width longitudinally of said crank case than the corresponding width of said portion to provide for tilting movement of said supporting member, and means to lock said member in adjusted position, said supporting member having a slot at its lower end extending laterally of said crank case, a block positioned within said slot for tilting movement laterally of said crank case and being provided with a vertically extending circular bore, a pilot bearing provided with a vertically extending shank, said shank being positioned within said bore for vertical movement and for rotation about a vertical axis and means to lock said block and said pilot bearing shank in adjusted position.

3. Main bearing boring apparatus comprising a plurality of brackets to be mounted on an inverted crank case and extending laterally thereof between adjacent main bearings, said brackets being adjustable laterally of said crank case, one of said brackets extending above said crank case and having a vertical slot therein, said slot having a flat surface extending longitudinally of said crank case, a pilot bearing supporting member positioned within said slot and having a flat surface corresponding to the flat surface of said slot, said slot being of greater width in a direction longitudinally of said crank case than said supporting member, to provide for tilting movement of said member, and locking means to force the flat surface of said member against the flat surface of said slot to lock said member in adjusted position, said supporting member having a slot at its lower end extending laterally of said crank case, a block positioned within said slot for tilting movement laterally of said crank case and being provided with a vertically extending circular bore, a pilot bearing provided with a vertically extending shank, said shank being positioned within said bore for vertical movement and for rotation about a vertical axis and means to lock said block and said pilot bearing shank in adjusted position.

4. Main bearing boring apparatus comprising a plurality of brackets to be secured to an inverted crank case and extending laterally thereof between adjacent main bearings, said brackets being adjustable laterally of said crank case, one of said brackets extending above said crank case and being provided with a vertically extending slot, a pilot bearing supporting member having a vertically extending portion positioned within said slot for vertical adjustment therein, said slot being of greater width than the corresponding width of said portion to provide for tilting movement of said supporting member, and means to lock said member in adjusted position, said supporting member having a rectangular slot at its lower end, a rectangular block positioned within said slot for tilting movement relative to said crank case and being provided with a vertically extending circular bore, a pilot bearing provided with a vertically extending shank, said shank being positioned within said bore for vertical movement and rotation about a vertical axis, and means to lock said rectangular member and said pilot bearing shank in adjusted position, the construction permitting tilting movement of the rectangular block and the supporting member in planes at right angles to each other, longitudinally and laterally relative to the crank case.

5. Main bearing boring apparatus comprising a plurality of brackets to be mounted on an inverted crank case and extending laterally thereof between adjacent main bearings, said brackets being adjustable laterally of said crank case, one of said brackets extending above said crank case and being provided with a vertically extending rectangular slot, a pilot bearing supporting member having a vertically extending rectangular portion positioned within said slot for vertical adjustment therein, said slot being of greater width than the corresponding width of said portion to provide for tilting movement of said supporting member, and means to lock said member in adjusted position, said supporting member having a slot at its lower end, a block positioned within said slot for tilting movement relative to said crank case and being provided with a vertically extending circular bore, a pilot bearing provided with a vertically extending shank, said shank being positioned within said bore for vertical movement and for rotation about a vertical axis and means to lock said block and said pilot bearing shank in adjusted position, the construction permitting tilting movement of the block and the supporting member in planes at right angles to each other, longitudinally and laterally relative to the crank case.

6. Main bearing boring apparatus comprising a plurality of brackets to be mounted on an inverted crank case and extending laterally thereof between adjacent main bearings, said brackets being adjustable laterally of said crank case, one of said brackets extending above said crank case and having a vertical slot therein, said slot having a flat surface, a pilot bearing supporting member positioned within said slot and having a flat surface corresponding to the flat surface of said slot, said slot being of greater width than said supporting member to provide for tilting movement of said member, and locking means to force the flat surface of said member against the flat surface of said slot to lock said member in adjusted position, said supporting member having a slot at its lower end, a block positioned within said slot for tilting movement relative to said crank case and being provided with a vertically extending circular bore, a pilot bearing provided with a vertically extending shank, said shank being positioned within said bore for vertical movement and for rotation about a vertical axis and means to lock said block and said pilot bearing shank in adjusted position, the construction permitting tilting movement of the block and the supporting member in planes at right angles to each other, longitudinally and laterally relative to the crank case.

In witness of the foregoing I affix my signature.

HARRY C. SHOEMAKER.